United States Patent [19]

Bishop, Jr.

[11] Patent Number: 5,624,169
[45] Date of Patent: Apr. 29, 1997

[54] MODULAR SUSPENDED MEDIA RACK

[76] Inventor: Bobby W. Bishop, Jr., 12481 Archer, Lemont, Ill. 60439

[21] Appl. No.: 404,561

[22] Filed: Mar. 15, 1995

[51] Int. Cl.$^6$ ............................................. A47B 88/00
[52] U.S. Cl. ................... 312/319.4; 187/404; 312/319.1; 312/9.1; 312/9.26; 312/9.32; 312/9.47; 312/9.52; 312/9.55; 312/9.56; 312/9.59; 206/308.1; 206/307; 206/387.12
[58] Field of Search ............................ 312/319.4, 319.1, 312/42, 350, 9.3, 9.26, 9.32, 9.46, 9.47, 9.52, 9.53, 9.54, 9.55, 9.56, 9.59, 9.61; 187/404; 206/308.1, 387.12, 307

[56] References Cited

U.S. PATENT DOCUMENTS

| | | | |
|---|---|---|---|
| 823,433 | 6/1906 | Niswonger et al. | 312/319.4 X |
| 926,304 | 6/1909 | Thompson | 312/319.4 X |
| 1,004,282 | 9/1911 | Lacroix | 312/319.4 |
| 1,320,497 | 11/1919 | Schey | 312/319.4 X |
| 1,820,427 | 8/1931 | Birmann | 187/404 X |
| 2,183,399 | 11/1939 | Forbes | 312/319.4 X |
| 2,634,186 | 4/1953 | Züss | 312/319.4 X |
| 2,634,188 | 4/1953 | Davis | 312/319.4 X |
| 3,085,655 | 4/1963 | Van Dyk | 312/319.4 X |
| 5,088,619 | 2/1992 | Shank . | |
| 5,097,946 | 3/1992 | Emrich . | |
| 5,191,983 | 3/1993 | Hardy . | |
| 5,249,677 | 10/1993 | Lim . | |
| 5,307,926 | 5/1994 | Mee . | |

FOREIGN PATENT DOCUMENTS

| | | | |
|---|---|---|---|
| 59012 | 8/1941 | Denmark | 108/147 |
| 490671 | 6/1992 | European Pat. Off. | 206/308.1 |
| 2616309 | 12/1988 | France | 108/144 |
| 4-89787 | 3/1992 | Japan | 187/404 |

*Primary Examiner*—Peter M. Cuomo
*Assistant Examiner*—Rodney B. White
*Attorney, Agent, or Firm*—Hill, Steadman & Simpson

[57] ABSTRACT

A rack for storing a plurality of recording media in a stacked configuration. The rack includes a platform upon which a stack of recording media can be positioned. The platform is movably mounted to a support assembly for supporting the platform relative to a surface. A biasing assembly urges the platform towards an upper portion of the support assembly and permits an insertion of additional recording media into a portion of the stack positioned upon the platform.

5 Claims, 4 Drawing Sheets

MODULAR SUSPENDED MEDIA RACK

BACKGROUND OF THE INVENTION

1. Field of the Invention

The present invention relates to rack structures and more particularly pertains to a modular suspended media rack for storing a plurality of recording media in a stacked configuration.

2. Description of the Prior Art

The use of rack structures is known in the prior art. More specifically, rack structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art rack structures include U.S. Pat. No. 5,307,926; U.S. Pat. No. 5,249,677; U.S. Pat. No. 5,191,983; U.S. Pat. No. 5,088,619; and U.S. Pat. No. 5,097,946.

While these devices fulfill their respective, particular objectives and requirements, the aforementioned patents do not disclose a modular suspended media rack for storing a plurality of recording media in a stacked configuration which includes a platform upon which a stack of recording media can be positioned, a support assembly for movably supporting the platform relative to a surface, and a biasing assembly urging the platform towards an upper portion of the support assembly and permitting an insertion of additional recording media into a portion of the stack positioned upon the platform.

In these respects, the modular suspended media rack according to the present invention substantially departs from the conventional concepts and designs of the prior art, and in so doing provides an apparatus primarily developed for the purpose of storing a plurality of recording media in a stacked configuration.

SUMMARY OF THE INVENTION

In view of the foregoing disadvantages inherent in the known types of rack structures now present in the prior art, the present invention provides a new modular suspended media rack construction wherein the same can be utilized for storing a stack of recording media. As such, the general purpose of the present invention, which will be described subsequently in greater detail, is to provide a new modular suspended media rack apparatus and method which has many of the advantages of the rack structures mentioned heretofore and many novel features that result in a modular suspended media rack which is not anticipated, rendered obvious, suggested, or even implied by any of the prior art rack structures, either alone or in any combination thereof.

To attain this, the present invention generally comprises a rack for storing a plurality of recording media in a stacked configuration. The inventive device includes a platform upon which a stack of recording media can be positioned. The platform is movably mounted to a support assembly for supporting the platform relative to a surface. A biasing assembly urges the platform towards an upper portion of the support assembly and permits an insertion of additional recording media into a portion of the stack positioned upon the platform.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new modular suspended media rack apparatus and method which has many of the advantages of the rack structures mentioned heretofore and many novel features that result in a modular suspended media rack which is not anticipated, rendered obvious, suggested, or even implied by any of the prior art rack structures, either alone or in any combination thereof.

It is another object of the present invention to provide a new modular suspended media rack which may be easily and efficiently manufactured and marketed.

It is a further object of the present invention to provide a new modular suspended media rack which is of a durable and reliable construction.

An even further object of the present invention is to provide a new modular suspended media rack which is susceptible of a low cost of manufacture with regard to both materials and labor, and which accordingly is then susceptible of low prices of sale to the consuming public, thereby making such modular suspended media racks economically available to the buying public.

Still yet another object of the present invention is to provide a new modular suspended media rack which provides in the apparatuses and methods of the prior art some of the advantages thereof, while simultaneously overcoming some of the disadvantages normally associated therewith.

Still another object of the present invention is to provide a new modular suspended media rack for storing a plurality of recording media in a stacked configuration.

Yet another object of the present invention is to provide a new modular suspended media rack which includes a platform upon which a stack of recording media can be positioned, a support assembly for movably supporting the platform relative to a surface, and a biasing assembly urging the platform towards an upper portion of the support assembly and permitting an insertion of additional recording media into a portion of the stack positioned upon the platform.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
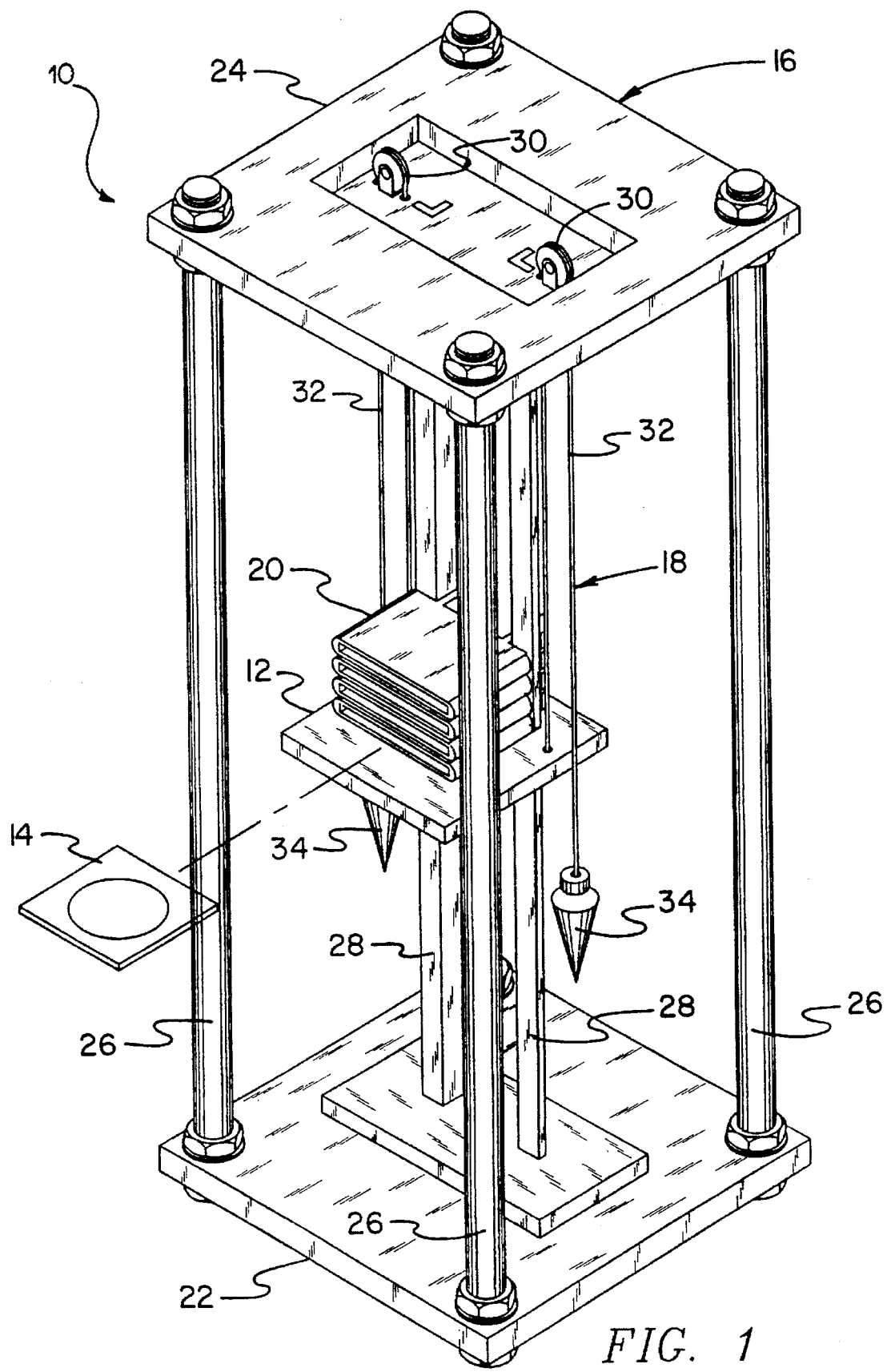
FIG. 1 is an isometric illustration of a modular suspended media rack according to the present invention.
Figure 2:
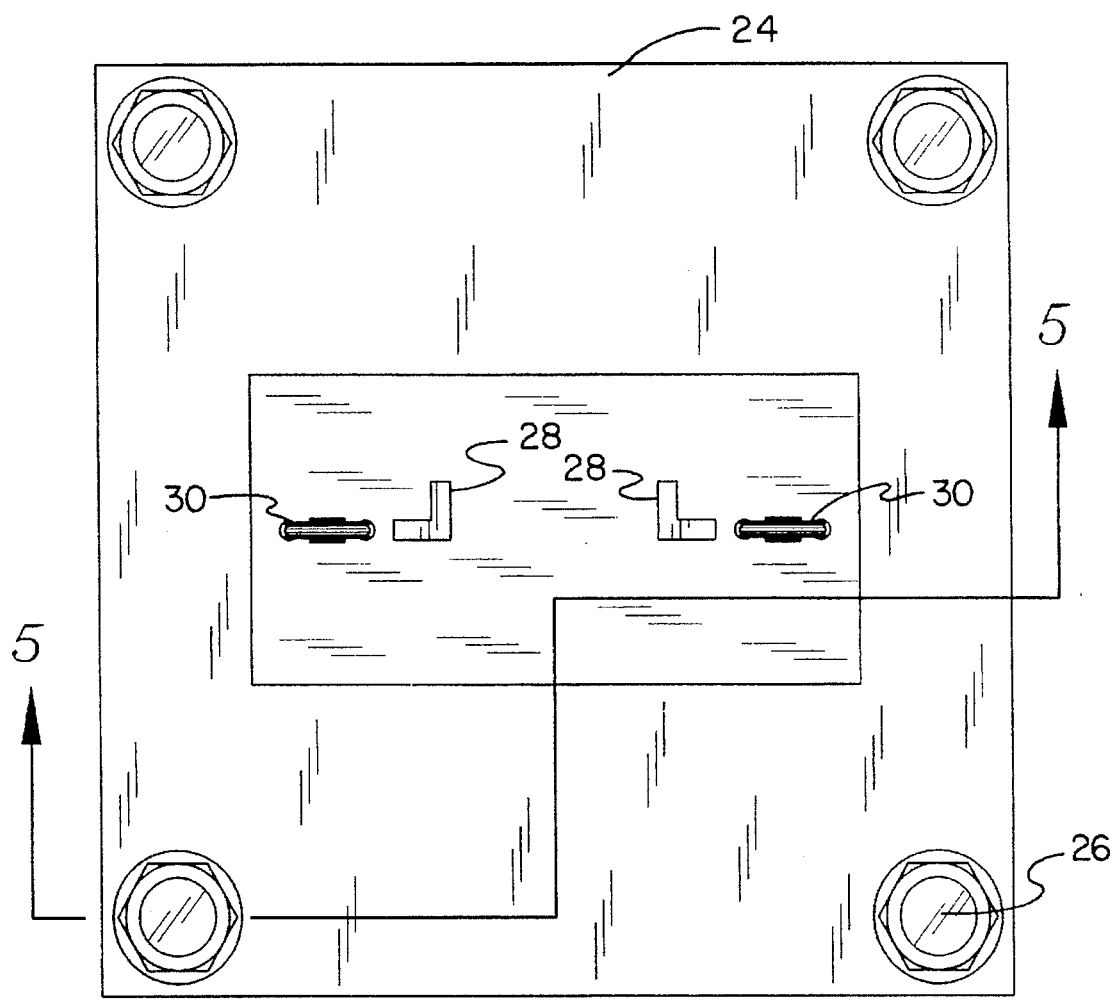
FIG. 2 is a top plane view of the invention.
Figure 3:
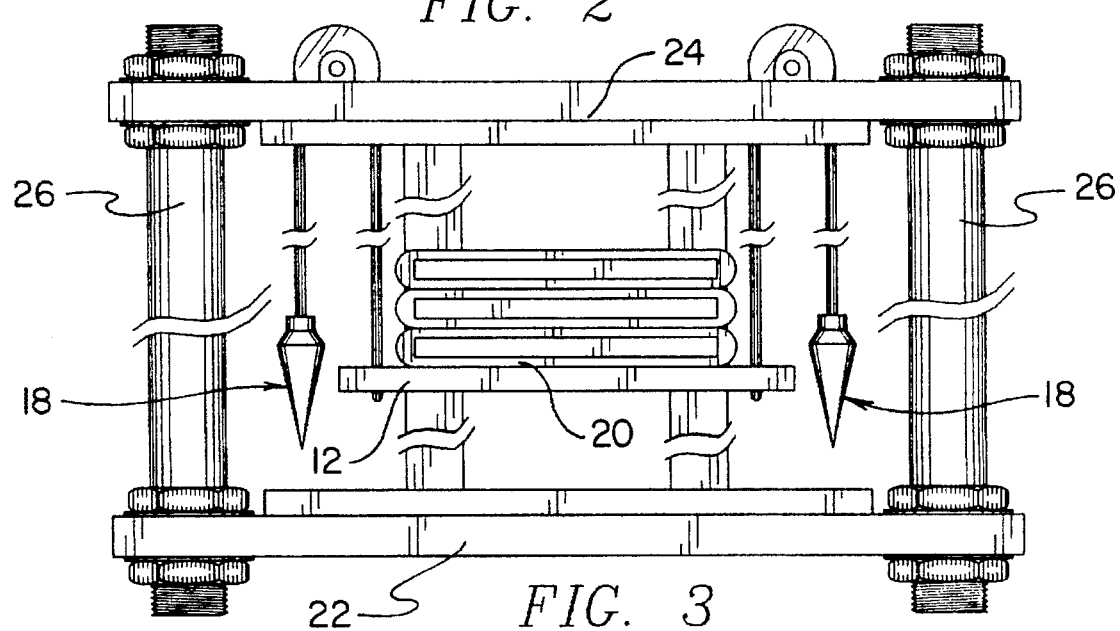
FIG. 3 is a front elevation view of the invention.
Figure 4:
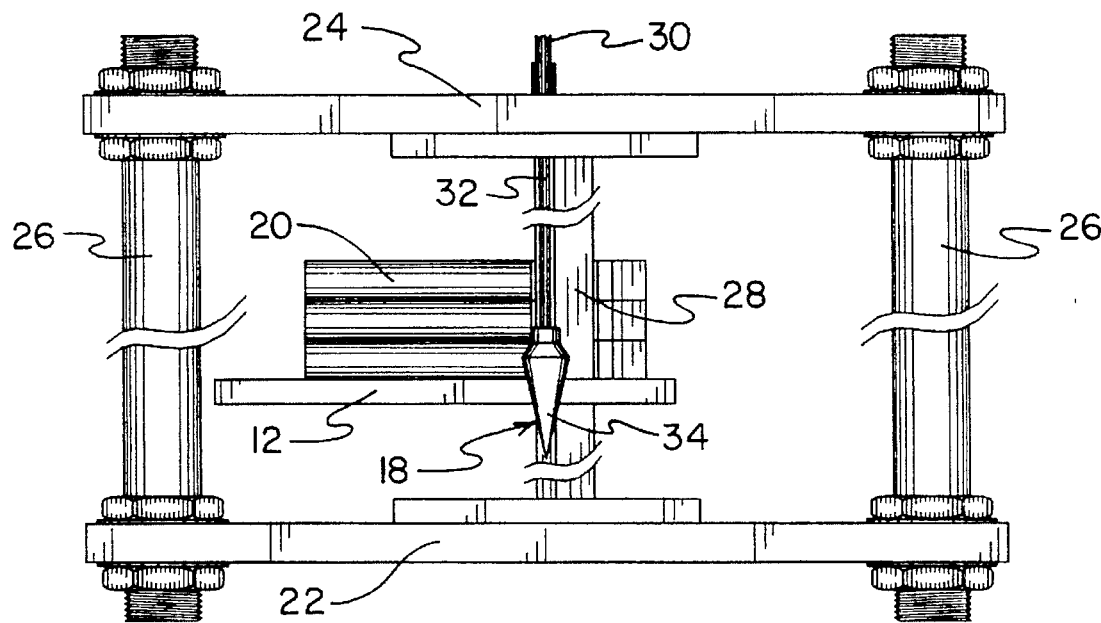
FIG. 4 is a side elevation view of the rack.
Figure 5:
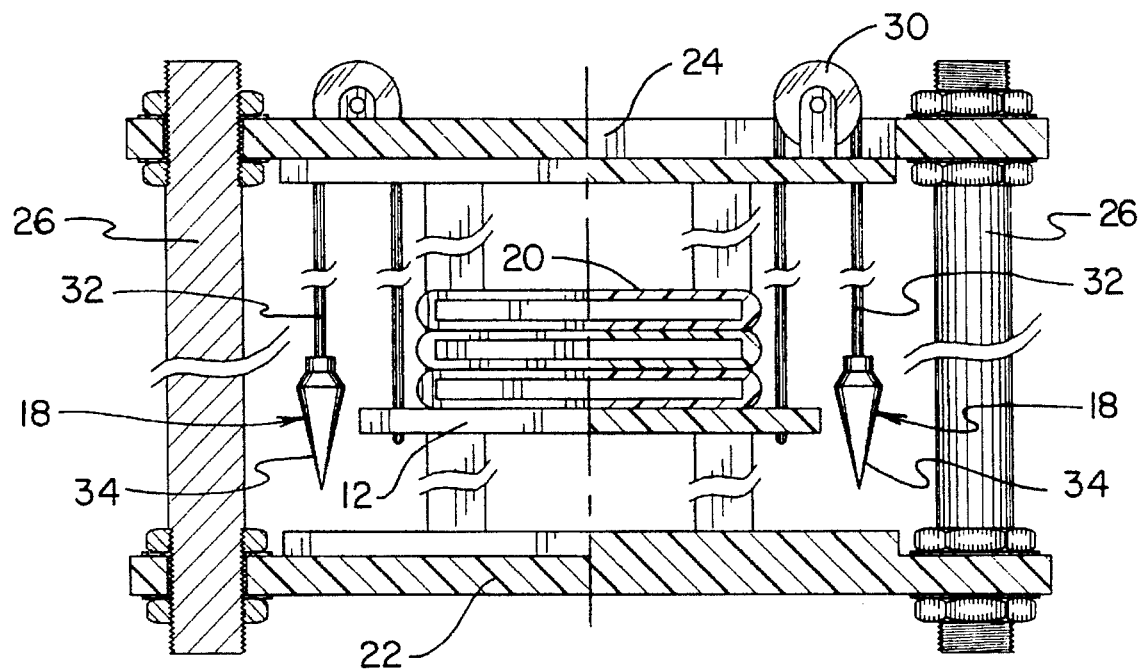
FIG. 5 is a cross sectional view taken along line 5—5 of FIG. 2.

With reference now to the drawings, and in particular to FIGS. 1–7 thereof, a new modular suspended media rack embodying the principles and concepts of the present invention and generally designated by the reference numeral 10 will be described.

More specifically, it will be noted that the modular suspended media rack 10 comprises a platform 12 upon which a plurality of recording media 14, such as compact discs, video tapes, tape cassettes, or the like can be stacked. A support means 16 is provided with the present invention 10 for movably supporting the platform 12 relative to an unillustrated supporting surface such as a table or a shelf. A biasing means 18 is coupled to the platform 12 for urging the platform towards an upper portion of a support means 16. By this structure, a stack of recording media 14 can be formed upon the platform 12 in an alphabetical or otherwise organized manner, with additional recording media being selectively insertable into any portion of the stack. If desired, a plurality of media receivers 20 can be provided and stacked upon the platform 12 as shown in FIG. 1, wherein the recording media 14 is individually positionable into each of the media receivers.

As best illustrated in FIGS. 1 through 5, it can be shown that the support means 16 according to the present invention 10 preferably comprises a lower plate 22 positionable upon a supporting surface such as a table or a shelf or the like. An upper plate 24 is supported in a spaced orientation relative to the lower plate 22 by a plurality of vertical stanchions 26 extending therebetween. A plurality of elongated guide members 28 extend between the lower plate 22 and the upper plate 24 and cooperate to movably mount the platform 12 relative to the support means 16. To this end, the elongated guide members 28 project through apertures in the platform 12 thus permitting a sliding movement of the platform relative to the elongated guide members 28 and the support means 16.

Figure 7:
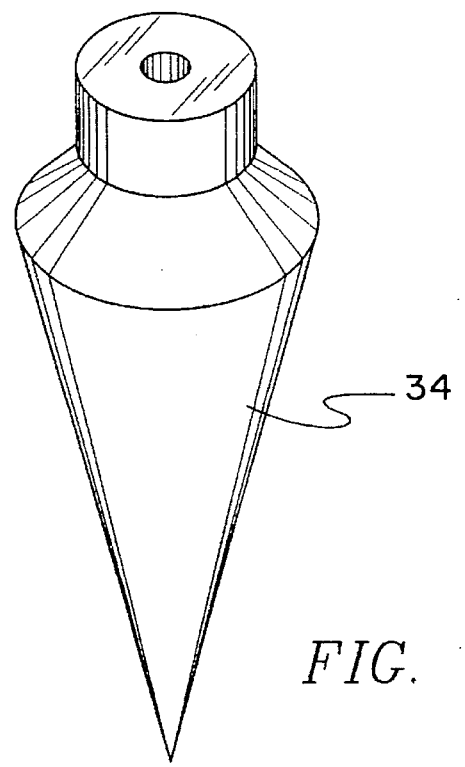
FIG. 7 is an isometric illustration of a weight of the present invention.

With continuing reference to FIGS. 1 through 5, it can be shown that the biasing means 18 according to the present invention 10 preferably comprises at least one pulley 30 rotatably mounted to the upper plate 24 of the support means 16. A cable 32 is coupled to the platform 12 and extends over the pulley 30 to terminate in a distal end whereat a weight 34 is secured. Preferably, the biasing means 18 comprises a pair of pulleys 30 mounted to the upper plate 24, with a pair of cables 32 being mounted to opposed sides of the platform 12 and each terminating in a weight 34. By this structure, a gravitational pull on the weight 34 will bias the platform 12 towards the upper plate 24 of the support means 16 to maintain recording media 14 positioned between the upper plate and the platform in a stacked configuration. As shown in FIG. 7, the weight 34 may be ornamentally shaped as a cone.

Figure 6:
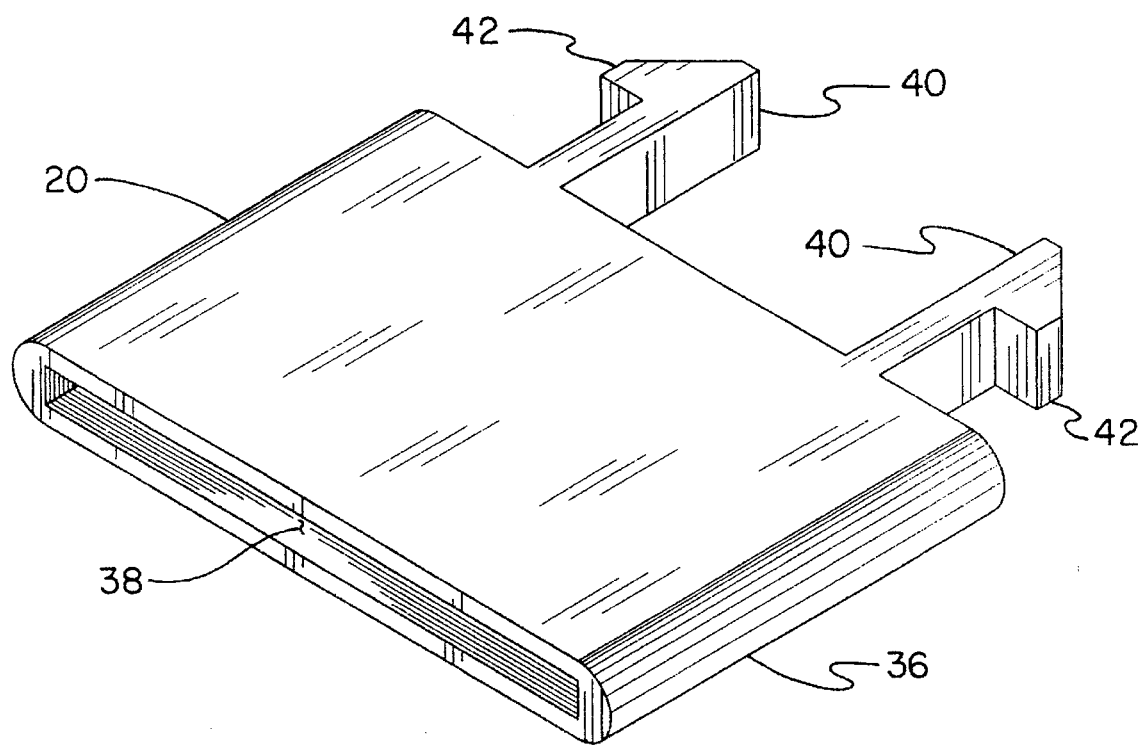
FIG. 6 is and isometric illustration of a media receiver of the present invention.

Referring now to FIG. 6 wherein an individual one of the media receivers 20 is illustrated in detail, it can be shown that the media receivers each comprise a substantially flat receiver body 36 having a cavity 38 directed thereinto within which recording media 14 can be positioned. A pair of mounting arms 40 project from a rear of the receiver body 36 and into a substantially spaced and parallel orientation configured for positioning between the elongated guide members 28 of the support means 16. Each of the mounting arms 40 terminates in an outer distal end from which a lateral projection 42 extends for engagement against the elongated guide members 28. The mounting arms 40 are constructed of a substantially resilient material whereby an inward deformation thereof is permitted during insertion of the mounting arms between elongated guide members 28 such that the guide members can reside between the lateral projections 42 and a rear of the receiver body 36 to secure the media receiver 20 relative to the support means 16.

In use, the modular suspended media rack 0 according to the present invention can be easily utilized to maintain a plurality of recording media 14 in a stacked configuration. Because the platform 12 is movable relative to the support means 16, the stack may be separated to permit insertion of an additional media receiver 20 and recording media 14. If desired, the present invention 10 may be utilized without the media receivers 20 wherein the recording media 14 are simply stacked one upon another between the upper plate 24 and the platform 12. However, it is desirable to utilize the media receivers 20 in the stacked configuration as illustrated in FIG. 1 so as to maintain the recording media 14 in an organized fashion. The biasing means 18 further serves to create a frictional engagement between adjacent media receivers 20 or recording media 14 as a result of the compression created between the platform 12 and the upper plate 24 between which the recording media 14 and/or the media receivers 20 are positioned.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired lo limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A modular suspended media rack comprising:

a platform upon which a plurality of recording media can be positioned;

a support means for movably supporting the platform relative to a support surface, the support means including a lower plate positionable upon a support surface, an upper plate, and a plurality of vertical stanchions extending between the upper and lower plates to support the upper plate in a spaced orientation relative to the lower plate, and a plurality of elongated members extending between the lower plate and the upper plate, the platform being movably mounted relative to the guide members of the support means;

a biasing means coupled to the platform for urging the platform towards an upper portion of the support means; and a plurality of media receivers arranged upon the platform in an infinitely adjustable vertical manner with respect to the platform, wherein recording media is individually positionable into each of the media receivers, the media receivers each comprise a substantially flat receiver body having a cavity directed thereinto within which recording media can be positioned, and a pair of mounting arms projecting from a rear of the receiver body and into a substantially spaced and parallel orientation for positioning between the elongated guide members of the support means, each of the mounting arms terminating in an outer distal end, a lateral projection extending from the outer distal ends of each of the mounting arms, wherein the mounting arms are constructed of a substantially resilient material whereby an inward deformation thereof is permitted during insertion of the mounting arms between elongated guide members such that the guide members can reside between the lateral projections and a rear of the receiver body to movably secure the media receivers relative to the support means.

2. The modular suspended media rack of claim 1, wherein the support means comprises a lower plate positionable upon a support surface; an upper plate; and a plurality of vertical stanchions extending between the upper and lower plates to support the upper plate in a spaced orientation relative to the lower plate; and a plurality of elongated guide members extending between the lower plate and the upper plate, the platform being movably mounted relative to the guide members of the support means.

3. The modular suspended media rack of claim 2, wherein the elongated guide members project through apertures in the platform to permit a sliding movement of the platform relative to the elongated guide members and the support means.

4. The modular suspended media rack of claim 3, wherein the biasing means comprises a pulley rotatably mounted to the upper plate of the support means; a cable coupled to the platform and extending over the pulley to terminate in a distal end; a weight secured to the distal end of the cable.

5. The modular suspended media rack of claim 3, wherein the biasing means comprises a pair of pulleys mounted to the upper plate; a pair of cables mounted to opposed sides of the platform and each extending over an individual one of the pulleys to terminate in a distal end; and a pair of weights, each of the weight being secured to the distal end of an individual one of the cables.

* * * * *